United States Patent [19]

King et al.

[11] 4,291,350

[45] Sep. 22, 1981

[54] SPRING SUSPENSION FOR MAGNETIC TRANSDUCER

[75] Inventors: Francis K. King, San Jose, Calif.; Donald J. Wanek, Rochester, Minn.

[73] Assignee: International Business Machines Corporation, Armonk, N.Y.

[21] Appl. No.: 76,719

[22] Filed: Sep. 19, 1979

Related U.S. Application Data

[63] Continuation of Ser. No. 974,600, Dec. 29, 1978, abandoned.

[51] Int. Cl.³ .......................... G11B 5/48; G11B 21.16
[52] U.S. Cl. .................................... 360/104; 360/109; 360/130.3
[58] Field of Search ............................... 360/104–106, 360/97–99, 86, 130.3, 133, 130.1, 109

[56] References Cited

U.S. PATENT DOCUMENTS

| | | | |
|---|---|---|---|
| 3,702,461 | 11/1972 | Cantwell | 360/103 |
| 3,812,535 | 5/1974 | Higgins et al. | 360/103 |
| 3,896,495 | 7/1975 | Beecroft | 360/103 |
| 3,914,792 | 10/1975 | Beecroft | 360/103 |
| 3,931,641 | 1/1976 | Watrous | 360/104 |
| 4,086,029 | 5/1978 | Castrodale et al. | 360/99 |
| 4,141,050 | 2/1979 | Wiseley | 360/104 |
| 4,167,766 | 9/1979 | Chau | 360/104 |

OTHER PUBLICATIONS

IBM/TDB vol. 18, No. 9, Feb. 1976, pp. 3018-3019, "Magnetic Head Load/Unload Device" by Wheeler.
IBM/TDB vol. 13, No. 9, Feb. 1971, p. 2507, "Self-Loading Contact Slider" by Lin et al.

*Primary Examiner*—John H. Wolff
*Attorney, Agent, or Firm*—Keith T. Bleuer

[57] ABSTRACT

A suspension for a magnetic transducer including a normally flat gimbal spring in the form of a figure eight, with a pair of tabs or ears at the sides of the eight by means of which the spring is mounted; and a folded backup spring having legs extending from a mounting side to the other side and then back again, with a depending leg and flange portion effective to provide pressure on the center of the gimbal spring and transducer so that the backup spring provides resilient backup force against translation of the transducer on its main axis and the gimbal spring provides resilience against transducer pitching and rolling.

6 Claims, 9 Drawing Figures

SPRING SUSPENSION FOR MAGNETIC TRANSDUCER

This is a continuation, of application Ser. No. 974,600 filed Dec. 29, 1978 now abandoned.

BACKGROUND OF THE INVENTION

The invention relates to magnetic transducers particularly those effective on flexible magnetic disks, and in particular the invention relates to spring suspensions for such transducers.

It has been previously proposed in Castrodale et al U.S. Pat. No. 4,089,029, issued May 9, 1978, to mount a magnetic transducer on a cantilever gimbal spring having a pair of opposite parallel extending leg portions connected by a transverse leg portion on which the transducer is fixed. These leg portions provide resilience against the pitching of the transducer on the disk with which it makes contact (up and down movements of the leading and trailing ends of the transducer along the magnetic track for the transducer) and also provide reslience against and allowing a rolling movement of the transducer on an axis extending at a tangent to the magnetic track. A spring loaded relatively rigid load arm applies a force to the transducer urging it into forceful contact with the disk, and this is done by means of a dimple and a flange portion on the load arm forming a type of universal joint, so that the transucer can quite freely pitch and roll without any influence on such movement by the load arm.

SUMMARY OF THE INVENTION

It is an object of the present invention to provide an improved spring suspension for a magnetic transducer, particularly one intended for use with a flexible magnetic disk that may have considerable movement in directions along the axis of rotation of the disk as the disk rotates.

More particularly, it is an object of the invention to provide a symmetrical flat gimbal spring on which the transducer is mounted symmetrically so that the resilience of the gimbal spring is uniform for pitching and rolling of the transducer in all directions.

It is a further object of the invention to provide a folded backup spring effective on the gimbal spring and thus on the transducer by means of a universal joint comprising a dimple on the gimbal spring and an associated flange portion of the backup spring extending normally to the main axis of the transducer, with the backup spring being of such dimensions and arrangement of parts so that the flange remains parallel with its original position even though substantial translation of the disk (in a direction perpendicular to its plane and parallel with its axis) takes place.

It is a further object of the invention to provide an improved transducer support carriage comprising a swingable arm carrying the transducer, with the carriage having abutment surfaces and portions on which the swingable arm is supported in its position in which the transducer carried thereby is engaged with the disk so that the arm is fixed in this position and does not provide an element of movement to the transducer under these conditions.

DESCRIPTION OF THE PREFERRED EMBODIMENT

Figure 1:
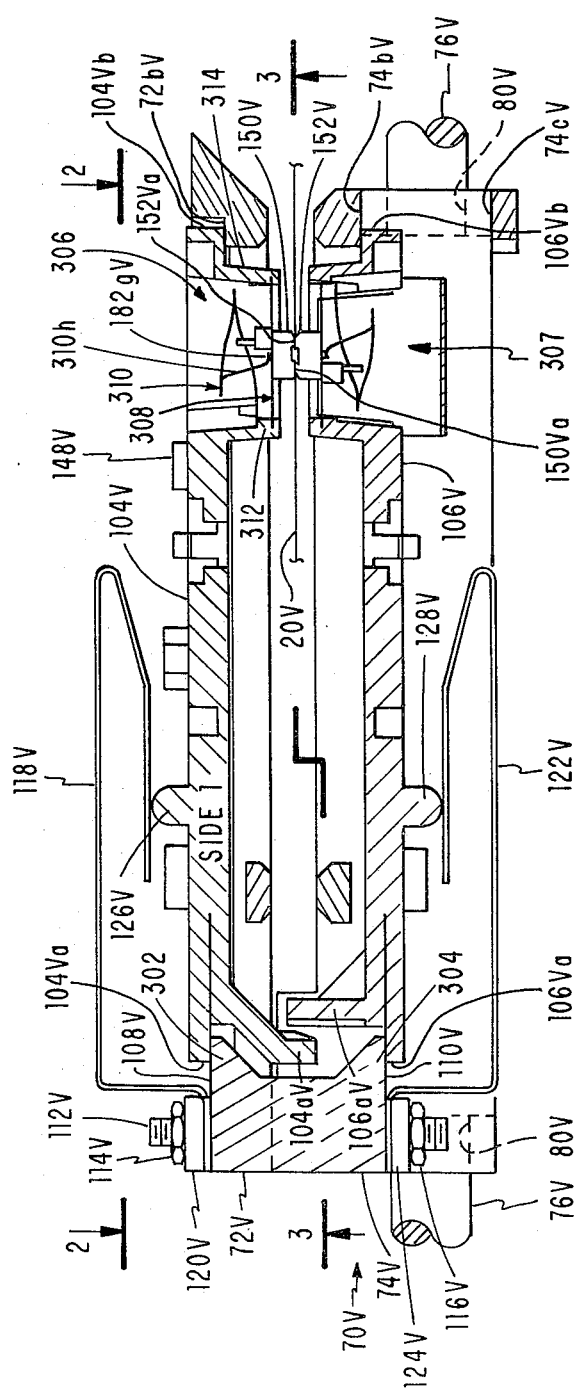
FIG. 1 is a longitudinal sectional view (taken on line 1—1 of FIG. 2) of a carriage for supporting a pair of transducers in effective pressure contact with a magnetic disk between the transducers and including a pair of swing arms on each of which one of the transducers is mounted by means of a spring suspension system including a gimbal spring and a folded backup spring.

The transducer carriage 70V shown herein corresponds to the transducer carriage 70 disclosed in Castrodale et al U.S. Pat. No. 4,089,029 issued May 9, 1978 and may be used instead of the carriage 70 of this patent and in the data storage apparatus disclosed in this patent. Parts of the carriage 70V shown herein using the suffix (V) in their reference characters correspond to parts in this patent similarly numbered but without the suffix (V). The carriage 70V shown herein includes the two carriage parts 72V and 74V of rigid material which are fixed together by means of bolts 112V and nuts 114V and 116V. The part 74V is provided with openings for receiving guide rods for reciprocatively mounting the carriage 70V including the openings 80V through which the guide rod 76V extends. The carriage 70V includes the swing arms 104V and 106V of rigid material swingingly disposed with respect to the parts 72V and 74V by means of leaf springs 108V and 110V. The spring 108V fits over the bolts 112V and beneath the nuts 114V along with a spacer 120V and a leaf return spring 118V. The spring 110V fits over the bolts 112V beneath the nuts 116V along with a spacer 124V and a leaf return spring 122V. The return springs 118V and 122V differ from the springs 118 and 122 in U.S. Pat. No 4,089,029 in being reversely bent; however, they bear on similar protrusions 126V and 128V on the swing arms 104V and 106V for the same purposes as the springs 118 and 122 in this patent. The arms 104V and 106V swing outwardly with respect to each other with flexing of the springs 108V and 110V, and coacting arm portions 104aV and 106aV are provided on the arms 104V and 106V for causing the arm 106V to swing outwardly when the arm 104V is swung outwardly. A hook 148V is provided on the arm 104 by means of which the arm 104V can be swung outwardly away from the arm 106V. The carriage parts 72V and 74V are respectively provided with abutment surfaces 72bV and 74bV for limiting the approaching swinging movement of the arms 104V and 106V, and the part 74V is provided with an abutment surface 74cV for limiting the outward movement of the swing arm 106V.

The parts 72V and 74V respectively have portions 302 and 304 which have no counterparts in the structure of U.S. Pat. No. 4,089,029. The portions 302 and 304 respectively underlie the base ends 104Va and 106Va of the arms 104V and 106V and extend beyond the ends 104Va and 106Va in the direction toward the distal ends 104Vb and 106Vb of the arms. The portions 302 and 304 thus support the base ends 104Va and 106Va of the arms 104V and 106V in the positions of these arms at their maximum approach in which the distal arm ends 104Vb and 106Vb are supported by the surfaces 72bV and 74bV.

Figure 3:
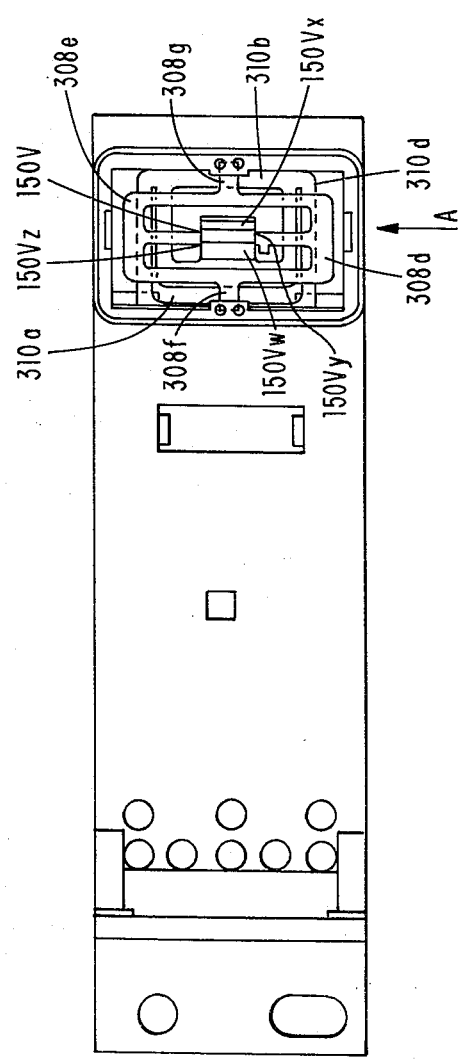
FIG. 3 is a plan view of the swing arm shown in FIG. 2 and taken from the other side of the arm and from line 3—3 of FIG. 1.

The arm 104V carries a transducer 150V which contacts a magnetic disk 20V by means of relatively wide and narrow transducer lands 150Vw and 150Vx and has leading and trailing edges 150Vy and 150Vz considering the direction A of movement of the disk 20V (see FIG. 3). The land 150Vw may be 0.75 mm wide, and the land 150Vx may be 0.5 mm wide, for example. The lands 150Vw and 150Vx are elongate in the direction A and together form the active front face 150Va of the transducer 150. The arm 106V carries a transducer 152V and has an active face 152Va. The transducers 150V and 152V correspond to and are identical with the transducers 150 and 152 disclosed in U.S. Pat. No. 4,089,029 except for the unequal width lands 150Vw and 150Vx. The transducers 150V and 152V are directly opposite each other on the opposite sides of the disk 20V, which is a part of a magnetic disk assembly as shown in FIG. 1 of U.S. Pat. No. 4,089,029. The nominal plane of the disk 20V is parallel with the guide rods, including guide rod 76V, on which the carriage 70V is slidably mounted. The transducer 150V is supported with respect to the arm 104V by means of a spring suspension 306, and the transducer 152V is supported with respect to the arm 106V by means of a spring suspension 307. The suspensions 306 and 307 are identical with the exception that they are simply turned through 180° with respect to each other.

Figure 6:
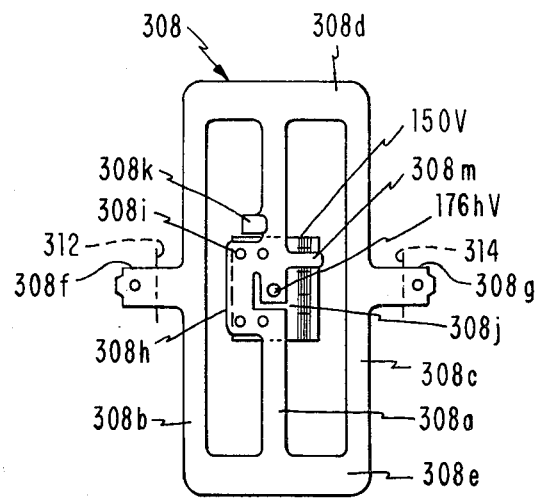
FIG. 6 is a plan view of the gimbal spring of the transducer supporting spring suspension as shown in FIG. 2 and taken on line 6—6 of FIG. 5.

The suspension 306 comprises a sheet metal gimbal spring 308, which is flat in unstressed condition and is generally in the form of a figure eight, and a bidirectionally extending backup spring 310. Referring to FIG. 6, the spring 308 may be seen to comprise a central leg 308a, two side legs 308b and 308c, two end legs 308d and 308e connecting the legs 308a, 308b and 308c and two mounting tabs or ears 308f and 308g. The leg 308a is provided with an enlargement 308h, and the transducer 150V is fixed at its back to the under surface of the leg 308a and enlargement 308h by bonding material extending through holes 308i in the leg 308a and enlargement 308h.

It will be observed from FIG. 6 in particular that the leg 308a is considerably longer than the length of the transducer 150V which is nearly coextensive, insofar as its length is concerned, with the enlargement 308h; the ratio of the length of the leg 308a to the length of the transducer 150V may be nearly 4 to 1, for example. The lengths of the legs 308a, 308b and 308c are equal, since the spring 308 is symmetrical, and these legs may have substantially the same widths. The end legs 308d and 308e are considerably shorter than the legs 308a, 308b and 308c. The leg 308a is located centrally with respect to the legs 308d and 308e as is apparent from FIG. 6, the ears 308f and 308g are located centrally with respect to the legs 308b and 308c and extend outwardly from and at right angles to these two legs. The ears 308f and 308g and the legs 308d and 308e may have substantially the same widths. The resistance to flexing of the ears 308f and 308g and the legs 308a–308e varies proportionally to the widths of these legs and ears, since the spring 308 is formed of a single piece of uniform thickness spring metal. The arm 104V is formed with a pair of flanges 312 and 314 in part defining an opening 315 through the arm 104V, and the ears 308f and 308g are molded into these flanges so that the portions of the ears 308f and 308g outside of the flanges 312 and 314 are relatively short in length, slightly less than twice the widths of each of the legs 308a, 308b and 308c.

The leg 308a is provided with a dimple 176hV pressed into it, and this dimple is located slightly offset from a center line Z that extends perpendicularly through the active face 150Va of the transducer 150V at the geometrical center of this working face. More particularly, the dimple 176hV is preferably located about 0.05 mm from the center line Z toward the wide land and 0.10 mm closer to the leading transducer edge 150Vy than to the trailing transducer edge 150Vz. The corresponding length and width of the transducer 150V may be 5.0 mm and 3.5 mm respectively. The relationship of the dimple 176hV to the transducer 150V is much the same as the relationship between the dimple 176h and the transducer 150 in U.S. Pat. No. 4,089,029 except that the offset of the dimple 176hV acts to maintain the lands 150Vw and 150Vx in substantially uniform pressure on the disk 20V, even with the transducer slightly flying with respect to the disk 20V with high disk speeds. A slot 308j is cut in the leg 308a to extend around the dimple 176hV for the purpose of preventing a buckling of the leg 308a and of the enlargement 308h by the step of punching the dimple 176hV out of the plane of the metal of the spring 308. The leg 308a has a U-shaped lug portion 308k formed on it for clamping suitable wiring for the transducer 150V and also has a grounding ear 308m formed on it.

Figure 2:
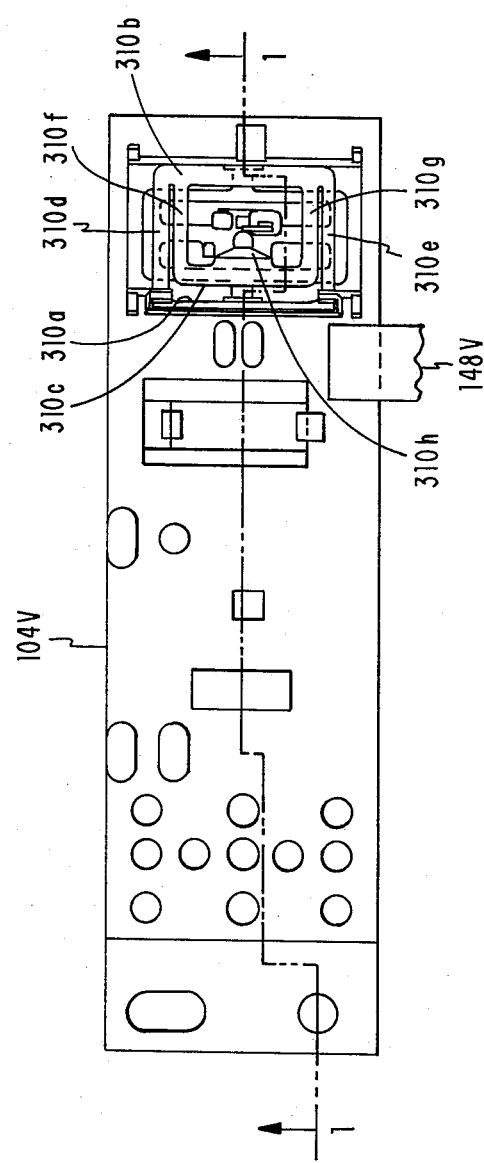
FIG. 2 is a plan view of one of the swing arms and its transducer supporting spring suspension, the view being taken from line 2—2 of FIG. 1.
Figure 4:
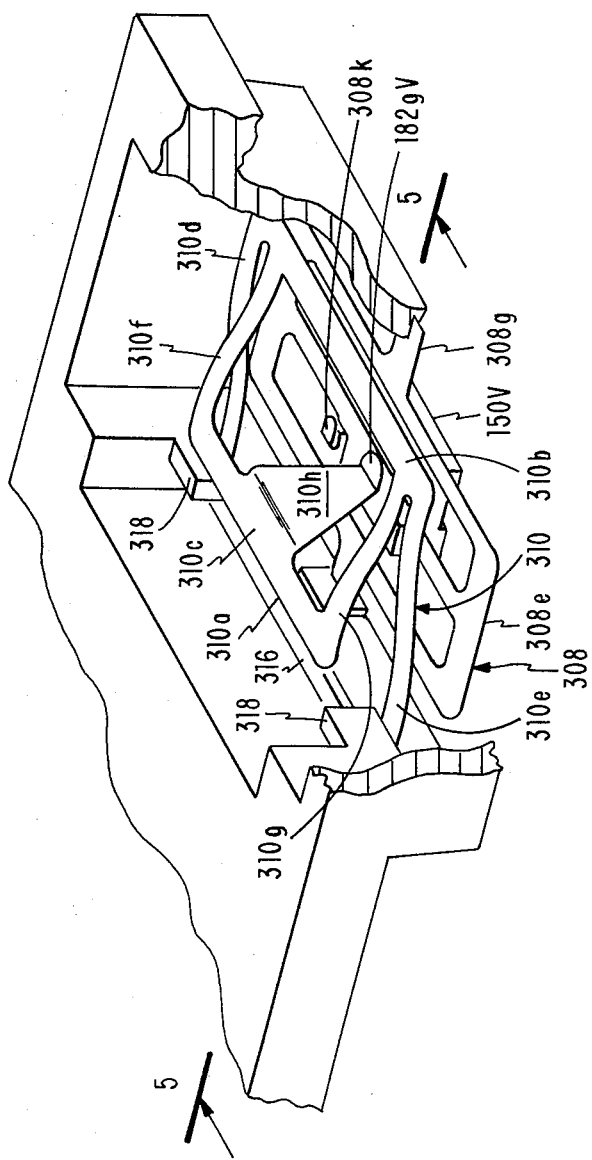
FIG. 4 is a perspective view of the transducer supporting spring suspension as shown in FIG. 2 with the transducer being assumed to be in pressure contact with a magnetic disk as in FIG. 1.
Figure 5:
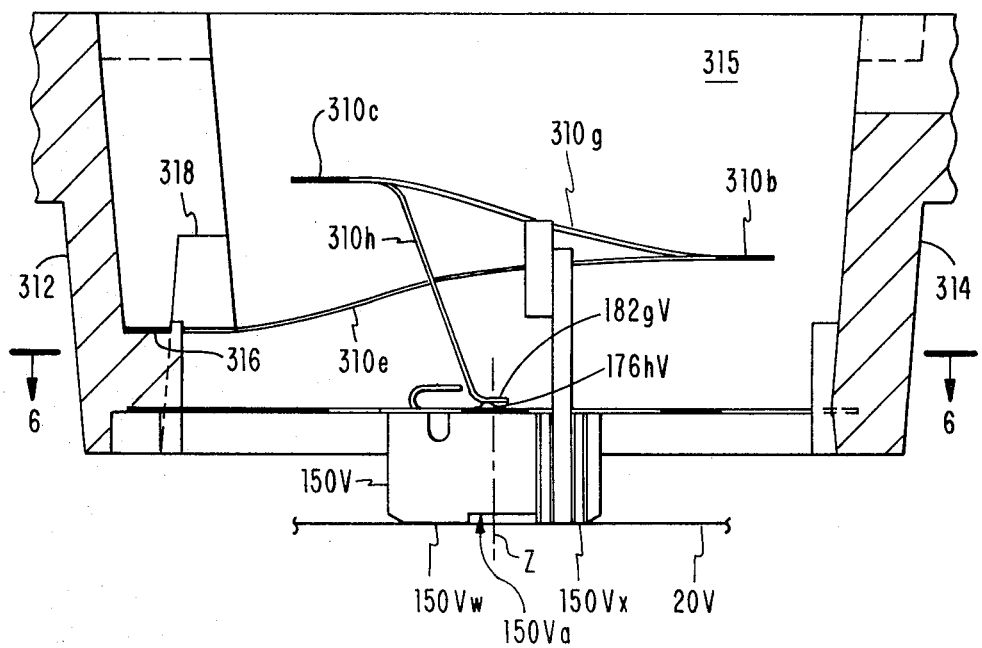
FIG. 5 is a longitudinal sectional view of the transducer spring suspension as shown in FIG. 2 and taken on line 5—5 of FIG. 4.

The spring 310 comprises three parallel legs 310a, 310b and 310c. End legs or first legs 310d and 310e connect the legs 310a and 310b, and end legs or second legs 310f and 310g connect the legs 310d and 310c. In plan, the legs 310d, 310f, 310g and 310e extend parallel with each other and at right angles to the legs 310a, 310b and 310c as is apparent from FIG. 2. The leg 310a is supported by a shelf 316 of flange 312 and is held thereon by posts 318. The first legs 310d and 310e extend outwardly (away from the transducer 150V) to the leg 310b, and the same is true of the second legs 310f and 310g with respect to the leg 310b and transducer 150V. A third leg 310h extends from the leg 310c toward the transducer 150V and dimple 176hV and terminates at its distal end in the flange portion 182gV that contacts the dimple 176hV. As shown in FIGS. 4 and 5 in particular, the second legs 310f and 310g double or fold back with respect to the first legs 310d and 310e, and the third leg 310h doubles or folds back with respect to the second legs 310f and 310g. The flange portion 182gV bears on the dimple 176hV due to the spring action of the spring 310 and extends parallel with the spring 308 and with the plane of the disk 20V, and the flange portion 182gV and the dimple 176hV form the same type of universal joint connection between a backup member and the transducer as is provided by the portion 182g and the dimple 176h in the carriage 70 of U.S. Pat. No. 4,089,029.

As previously mentioned, the suspension 307 is the same as the assembly 306, being simply turned through 180° with respect to suspension 306; and the transducers 150V and 152V bear on each other or against the opposite faces of the disk 20V due principally to the spring 310 bearing on the dimple 176hV in each suspension, so that there may be a data transferring action between the transducers 150V and 152V and the disk 20V.

Figure 8:
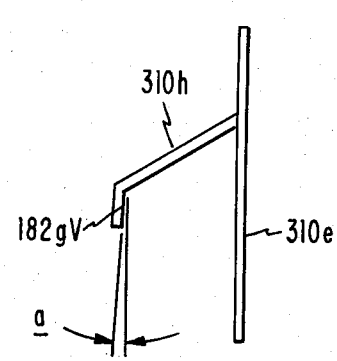
FIG. 8 is a side elevational view of the backup spring in unflexed condition.
Figure 7:
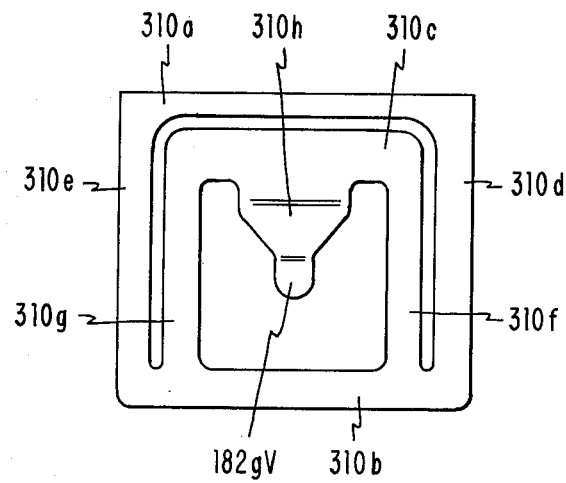
FIG. 7 is a plan view of the backup spring in unflexed condition.

When the spring 310 is assembled in the flange 312, the legs 310d, 310e, 310f and 310g are flexed outwardly (in the direction away from the gimbal spring 308) against the restraining action of the gimbal spring 308. Before this assembly operation, the gimbal spring 308 is in its flat unstressed disposition with the ears 308f and 308g anchoring the gimbal spring 308 in the opening 315. Initially, the spring 310 when in unflexed condition is flat as shown in FIGS. 7 and 8 with the exception of the third leg 310h and its flange 182gV. The spring 310 may be etched from a uniform thickness of spring sheet metal in this condition except for the third leg 310h and its flange 182gV which are bent from the initial flat thickness of stock so that the parts 310h and 182gV depend from the plane of the legs 310a–310g. The flange 182gV in this unstressed condition of the spring 310 extends at a small angle a (such as 4°) with respect to a plane parallel to the legs 310a–310g. When the spring 310 is thus assembled in opening 315, the legs 310d and 310e fixed with respect to the flange 312 are flexed outwardly (away from the gimbal spring 308); the legs 310f and 310g are also flexed outwardly in this direction, and the leg 310h depends downwardly into contact with the dimple 176hV of the gimbal spring 308. With the spring 310 being thus stressed, the flange portion 182gV extends parallel with the nominal plane of the gimbal spring 308. Since the gimbal spring 308 supports the backup spring 310 in its disposition as thus flexed, the gimbal spring 308 is depressed out of exact flatness (assuming at this time that the transducer 150V is not in engagement with the disk 20V). When the arms 104V and 106V are moved togehter, the gimbal spring 308 and the backup spring 310 for the transducer 150V are moved into their dispositions shown in FIG. 5, with the gimbal spring 308 being substantially flat, due to the forces exerted by the two transducers 150V and 152V on each other through the flexible disk 20V, with both of the transducers being supported by gimbal springs 308 and backup springs 310.

Figure 9:
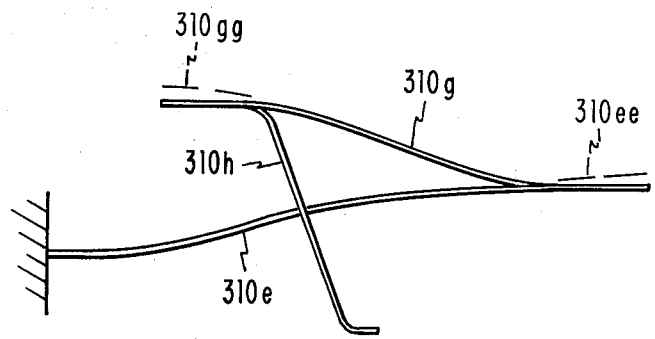
FIG. 9 is a diagrammatic side elevational view of the backup spring in flexed condition to illustrate the functioning of the various legs of the backup spring.

FIG. 9, which shows an exaggerated disposition of the backup spring 310, may be referred to for an understanding of the manner in which the backup spring 310 flexes when it is thus being loaded onto the dimple 176hV and during its subsequent operaton in holding the transducer 150V in contact with the flexible disk 20V and opposite to and against the force of the transducer 152V which is similarly loaded. First leg 310e is anchored in the support flange 312, and if first leg 310e were the only leg in the system, it would act like a simple cantilever beam and would swing up when force is applied to its far end, shortening itself and rotating its far end. This is shown by the dotted position 310ee of the far end of first leg 310e in FIG. 9, it being understood that the far end of the first leg 310e never takes this disposition in actual practice. Since the leg 310e is swung upwardly (away from the gimbal spring 308), its far end is in effect translated closer to the flange 312 than when the leg 310 is straight, and the rotation of its far end is indicated by the fact that the far end 310ee extends upwardly (away from the gimbal spring 308). The rotation of the leg 310e is restrained in the actual device when installed in the arm 104V by the second leg 310g and the leg 310b which is intergral with both of the legs 310e and 310g and connects them. Under these conditions, as shown in FIGS. 5 and 9, the leg 310b is actually substantially parallel with the plane of the gimbal spring 308, the leg 310e takes a slightly S shaped disposition.

When the spring 310 is assembled in the arm 104V, the second leg 310g is bent upwardly (away from the plane of the gimbal spring 308), and the leg 310g is shortened in effect so that its far end 310gg is located farther from the flange 312 than would be case if the leg 310g extended parallel with the plane of the gimbal spring 308. The far end 310gg of the leg 310g would also be rotated as indicated by the fact that the far the end 310gg shown in dotted lines extends upwardly (away from the plane of the gimbal spring 308). This tendency to rotate is overcome by the third leg 310h and the leg 310c which integrally connects the legs 310g and 310h, and the leg 310c in actual practice also extends substantially parallel with the plane of the gimbal spring 308, since the flange 182gV on the end of the leg 310h bears forcefully on the dimple 176hV. The second leg 310g thus, like the first leg 310e, also has a slightly S shaped disposition as shown in FIGS. 5 and 9.

Since the legs 310e and 310g extend in opposite directions, with the leg 310g being folded over and back with respect to the leg 310e, the two translations of the far ends of the legs 310e and 310g in effect cancel and compensate for each other. There are also substantially equal rotations of the far ends of the two legs 310e and 310g, due to the effect of the leg 310g on the leg 310e and due to the effect of the leg 310h on the leg 310g, and the rotational effects of the far ends of the legs 310e and 310g are overcome. The rotational motion of the flange 182gV and the shortening effects of the two legs 310e and 310g have thus been eliminated. For these reasons, the flange 182gV resting on the dimple 176hV goes through a very uniform motion perpendicular to the plane of the gimbal spring 308, with very small sideward motion and forces by the flange 182gV with respect to the dimple 176hV.

Although in the above description of operation, the legs 310e and 310g have been referred to in particular, it is apparent that the legs 310d and 310f are companion to these legs 310e and 310g and function in the same manner for applying a force to the leg 310h. The legs 310e, 310g and 310h are in effect connected serially; and likewise the legs 310d, 310f and 310h are connected serially. The legs 310e, 310g, 310d and 310f provide a balanced construction, with the legs 310e and 310d on opposite sides and with the legs 310g and 310f on opposite sides so that the upper portion of the transducer as shown in FIG. 5 does not interfere with these legs. The central leg 310h in effect is about twice the width of each of the legs 310e, 310g, 310d and 310f and thus amounts to a combination equal to the opposite pairs of legs 310f and 310g. Since the leg 310h is considerably shorter than the other functional legs 310e, 310g, 310f and 310d, leg 310h has a relatively small amount of deflection and bending in comparison with the deflection and bending of these others legs. The leg 310h doubles back on the legs 310f and 310g (while the legs 310g and 310f respectively double back on the legs 310e and 310d), so that the central leg 310h does not interfere with the upper portion of the transducer 150V in resting on the dimple 176hV. Since each of the legs 310e and 310d are anchored in the flange 312, the leg 310a could be omitted if desired. The leg 310b of course intergrally connects the legs 310e and 310g and also intergrally connects legs 310d and 310f and is important from this standpoint as previously described. The central portion of the leg 310b between the legs 310g and 310f simply functions as a connector to connect the legs on the two sides together. The leg 310c is important from the standpoint of transmitting rotational force from the legs 310g and 310f to the central leg 310h as above mentioned.

Thus the flange portion 182gV applied a force onto the dimple 176hV, tending to hold the transducer 150V in forceful relationship with the transducer 152V which has the spring suspension assembly 307 of the same type as the spring assembly 306 acting on it. The disk 20V tends to have some movement in the axes of the transducers 150V and 152V, and this translation is against the forces due to the springs 310 of the spring suspensions 306 and 307 and is also against the flexing actions of all of the legs 308a–308e and ears 308f and 308g of the springs 308.

The disk 20V may be expected also to have a rippling effect. Therefore, when the parts are in their FIG. 1 positions, the transducer 150V pitches, that is, has its leading and trailing ends move up and down in the direction of movement of the disk and the magnetic track thereon passing between the transducers 150V and 152V (on an axis parallel with the plane of the disk 20V and perpendicular to the axis of the central leg 308a). The disk 20V moves in direction A across the transducer 150V as shown in FIG. 3. The ears 308f and 308g in particular torsionally flex with subordinate flexing of the legs 308a, 308b and 308c with this pitching motion of the transducer 150V and tend to return the transducer 150V into an original position in which the spring 308 is flat. The same is true of the transducer 152V and the corresponding spring ears of the spring suspension 307, and it will be understood that the pitching of the transducers 150V and 152V is directly opposite to each other, since the front active faces 150Va and 152Va of the transducers 150V and 152V at all times remain in contact with the disk 20V and are located directly opposite each other.

The disk 20V may also expected to have an out of plane movement causing a rolling of the transducer 150V at right angles to its pitching motion and on an axis parallel with the leg 308a, twisting the leg 308a. The leg 308a thus tends to return the transducer 150V into its original position so that the leg 308a is flat. The transducer 152V has an opposing rolling motion, since the transducers 150V and 152V remain in contact with the opposite faces of the disk 20V, and the spring suspension 307 acts in the same manner with respect to the transducer 152V.

Advantageously, the gimbal spring 308 is symmetrical—the legs 308a, 308b and 308c are of equal lengths and are equally spaced; and legs 308d and 308e are equal in length; and the ears 308f and 308g are located centrally with respect to the legs 308d and 308e. Thus, the resiliency of the gimbal spring 308 tends to provide equal forces tending to return the transducer 150V to its original position in pitching and rolling movements of the transducer 150V. During such pitching and rolling movements, the transducer 150V pivots about the universal joint connection supporting it including the dimple 176hV and the flange portion 182gV. The widths and lengths of the ears 308f and 308g and of the legs 308a–308e are such as to provide a proper resilient response to pitching of the transducer 150 (in the direction of movement of disk 20V and of the magnetic track which the transducer 150V is following at the time and about an axis parallel with the plane of the disk 20V and perpendicular to the central leg 308a). The central leg 308a is relatively long (being about four times as long as the transducer 150V in the direction of the leg 308a) and thus the central leg 308a provides a proper resilient response to rolling of the transducer 150V on an axis parallel with the central leg 308a.

The backup spring 310 having a folded construction in which the legs 310f and 310g extend in opposite directions with respect to the legs 310d and 310e advantageously provides a very flat rate spring effective for holding the gimbal spring 308 flat and in its original plane. The disk 20V may translate (move slightly in directions parallel with the axis of rotation of the disk 20V and main transducer axis Z, and normal to the disk engaging front face 150Va of transducer 150V); but yet, due to this folded construction of spring 310, the flange portion 182gV remains substantially parallel with the original plane of the gimbal spring 308 and with the plane of the disk 20V. Thus the flange portion 182gV does not exert a side force or act as a cantilever beam and does not move across the dimple 176hV appreciably during translation of the disk 20V which would disturb the force relationship between the transducers 150V and 152V and would cause transducer to disk off track misregistration. The arrangement of the flat gimbal spring 308V backed up by the folded backup spring 310 effectively decouples the rolling and pitching motions of the transducer 150V and its translation (normal to transducer face 150aV and on axis Z) and eliminates an associated transducer roll off track problem. Due to this decoupling, and due to the fact that the backup spring 310 provides a very flat spring rate, the leg 308a which primarily resists and controls transducer rolling and the ears 308f and 308g which primarily resist and control transducer pitching can be tuned to fit particular stiffness design requirements and to satisfy particular transducer to disk dynamic response criteria. In addition, the folded backup spring 310 provides a relatively compact transducer suspension requiring a minimum length of the arm 104V, and the overall design is relatively economical to manufacture since the suspension 307 is the same as the suspension 306 and since each of the suspensions 306 and 307 consists of only the two springs 308 and 310.

All of the above remarks made with respect to transducer 150V apply equally to transducer 152V although it will be realized that the pitching, rolling and translatory movements of the two transducers are simultaneous, equal and opposite since the two transducers are aligned with each other on the two opposite sides of the disk and simultaneously engage the two opposite sides of the disk primarily under force from the spring 310 in each suspension 306 and 307.

When the swing arms 104V and 106V are in their positions of closest approachment for data transfer as shown as FIG. 1, they are each firmly supported with respect to the parts 72V and 74V, since the base ends 104Va and 106Va bear on the parts 72V and 74V respectively while the distal ends 104Vb and 106Vb on the abutment surfaces 72bV and 74bV. Thus, the transducers 150V and 152V are held firmly aligned with the carriage parts 72V and 74V and with their active faces 150Va and 152Va normally exactly parallel with each other without any deviations that flexings of the springs 108V and 110V might provide.

The placement of the dimple 176hV slightly to the left of the axis Z in FIG. 5 and slightly closer to the leading edge 150Vy than to the trailing edge 150Vz results in the lands 150Vw and 150Vx having a substantially uniform pressure relationship for their complete areas with the disk 20V even though the land 150Vw has more area than the land 150Vx and even though the leading edge 150Vy tends to plane away from the disk 20V for high disk speeds promoting a flying condition of the transducer 150V. The same is true, of course, for the opposite transducer 152V.

What is claimed is:

1. A transducer suspension assembly comprising:
   a rigid support,
   a gimbal spring of thin flexible material attached to said support,
   a transducer fixed to and thereby supported and carried by said gimbal spring, and
   a backup spring of thin sheet spring material having a first leg fixed at one end thereof to said rigid support, a second leg connected serially with said first leg and folded back with respect to said first leg to permit flexure of said second leg in a pivotal direction opposite the pivotal direction of flexure of said first leg and a third leg connected serially with said second leg and folded back with respect to said second leg and having its distal end backing up said transducer and thereby applying a force on the transducer.

2. A transducer suspension assembly as set forth in claim 1, said backup spring having a companion first leg fixed at one end thereof to said rigid support and a companion first leg connected serially with said companion first leg and folded back with respect to said companion second leg and connected along with said above mentioned second leg with said above mentioned third leg, said third leg being disposed between said first and second legs on one side of said third leg and said companion legs on the other side of said third leg.

3. A transducer suspension as set forth in claim 1, said backup spring having a companion first leg fixed at one end thereof to said rigid support, a companion second leg connected serially with said companion first leg and folded back with respect to said companion first leg, a fourth leg connecting said first and second legs with said companion first and companion second legs, and a fifth leg connecting said second leg and said companion second leg with said third leg.

4. A transducer suspension assembly as set forth in claim 1, said first and second legs both having distal end portions extending in directions away from said transducer and said third leg extending in a direction toward said transducer.

5. A transducer suspension assembly as set forth in claim 4, said gimbal spring having a raised dimple formed in it substantially at the middle of said transducer carried by the gimbal spring, said third leg having on its said distal end an ultimate flange portion which extends substantially in the same plane as the plane of said gimbal spring and contacts said dimple for thereby applying a force on the transducer for assisting the gimbal spring in supporting the transducer as aforesaid.

6. A transducer suspension assembly as set forth in claim 1, said backup spring having a companion first leg fixed at one end thereof to said rigid support and a companion second leg connected serially with said companion first leg and folded back with respect to said companion first leg and connected along with said above mentioned second led with said above mentioned third leg, said third leg being disposed between said first and second legs on one side of said third leg and said companion legs on the other side of said third leg, said rigid support having an opening therethrough and said gimbal spring having a pair of end tabs fixed with respect to the sides of said opening to attach said gimbal spring to said rigid support and said ends of said first leg and companion first leg being fixed to a side of said opening, said transducer having a front face and a back and fixed at its back on said gimbal spring, said gimbal spring having a raised dimple formed in it substantially at the middle of the transducer carried by the gimbal spring, said third leg having on its said distal end an ultimate flange porion which is bent with respect to the third leg so that the flange portion extends substantially parallel with the plane of said gimbal spring and which bears upon said dimple so as to provide a universal joint type of connection between said backup spring and said gimbal spring, said first and second legs and said companion first and second legs extending parallel with each other and said backup spring having parallel spaced fourth and fifth legs extending substantially at right angles to said first and second legs and to said companion first and second legs, said fourth leg forming the common ends of said first and second and companion first and companion second legs, and said fifth leg joining ends of said second and companion second legs with said third leg.

* * * * *

UNITED STATES PATENT AND TRADEMARK OFFICE
CERTIFICATE OF CORRECTION

PATENT NO. : 4,291,350
DATED : September 22, 1981
INVENTOR(S) : Francis K. King and Donald J. Wanek It is certified that error appears in the above—identified patent and that said Letters Patent is hereby corrected as shown below:

Column 9, line 38, cancel "first leg", and insert --second leg--.

Column 9, line 40, cancel "second leg", and insert --first leg--.

Column 10, line 23, cancel "led", and insert --leg--.

Signed and Sealed this

Second Day of February 1982

[SEAL]

Attest:

Attesting Officer

GERALD J. MOSSINGHOFF
Commissioner of Patents and Trademarks